March 20, 1962 H. G. BLOSSER ET AL 3,026,507
WHEEL SLIP AND SLIDE INDICATING CIRCUIT
Filed May 2, 1958
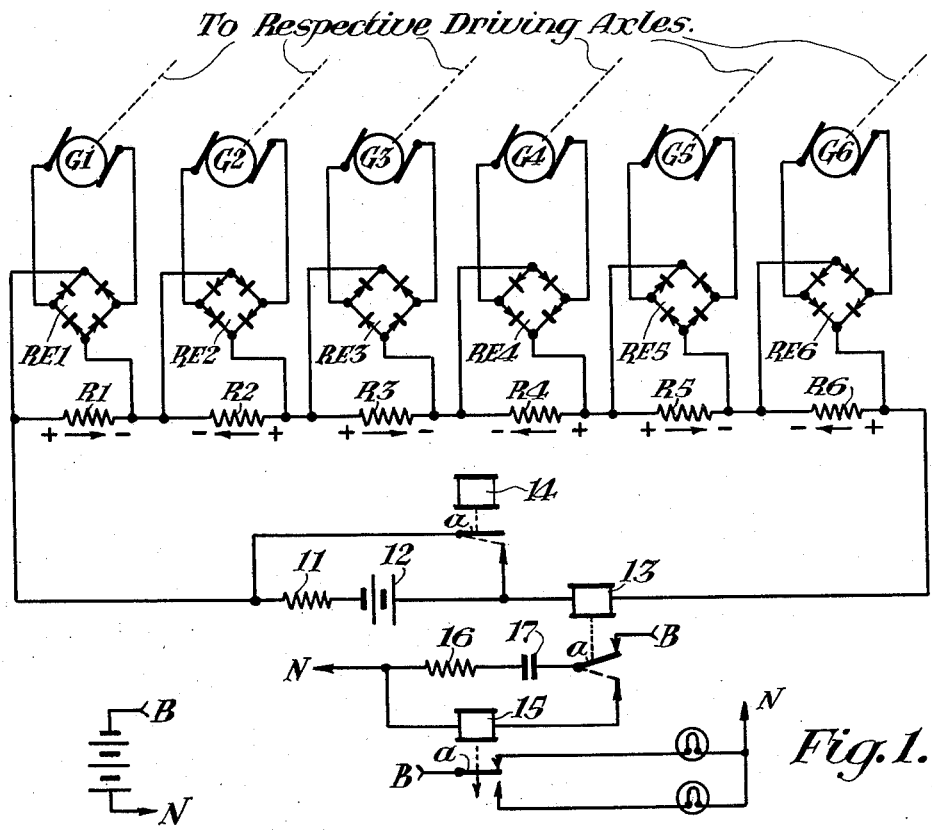
*Fig. 1.*
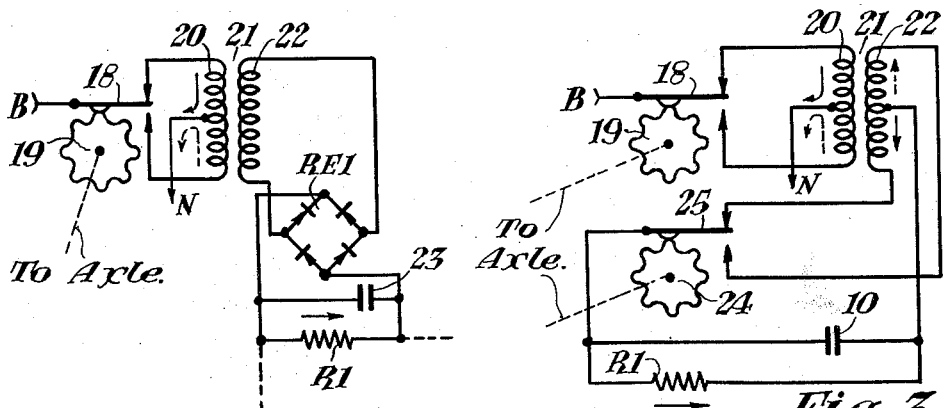
*Fig. 2.* *Fig. 3.*
INVENTORS
*Herman G. Blosser and
Leslie R. Allison.*
BY
*W. L. Stout.*
THEIR ATTORNEY

United States Patent Office 3,026,507
Patented Mar. 20, 1962

3,026,507
WHEEL SLIP AND SLIDE INDICATING CIRCUIT
Herman G. Blosser and Leslie R. Allison, Pittsburgh, Pa., assignors to Westinghouse Air Brake Company, Wilmerding, Pa., a corporation of Pennsylvania
Filed May 2, 1958, Ser. No. 732,598
5 Claims. (Cl. 340—271)

Our invention relates to an indicating circuit for detecting deviations in the angular velocity of different pairs of wheels on a railway locomotive, and more particularly to such an indicating circuit which is fail-safe.

On a railway locomotive having motorized axles, it is desirable to provide some means for detecting when a pair of wheels is slipping or sliding and hence turning at a substantially faster or slower rate than the other pairs of wheels. The need to provide means for detecting when wheels are slipping or sliding arises from the severe damage to the rails and to the wheels that may result when these conditions occur for any appreciable length of time. Various devices have been developed to meet this need. Such devices are relatively complicated and moreover many of them include no means for detecting when the indicating circuit itself is inoperative, that is, the indicating circuits are not fail-safe.

Accordingly, it is a principal object of our invention to provide a relatively uncomplicated and improved indicating circuit particularly adapted for detecting deviations in the speed relationships of locomotive wheels.

It is another object of our invention to provide an improved fail-safe indicating circuit for detecting deviations in the angular velocity of locomotive train wheels.

In attainment of the foregoing objects we provide a fail-safe indicating circuit including in one practical embodiment a plurality of alternating current generators arranged to be driven by respective motor driven axles. The operating output of each of the generators is rectified and connected across a portion of a common impedance. The operating outputs are so rectified that the voltages developed in the common impedance due to the various generators are in series opposing relation and hence tend to balance or cancel-out when all the axles are rotating at the same velocity. A first relay connected across said common impedance is adapted to be energized periodically by a battery at a code rate only when the total operating output from the generators balances. Said first relay is continuously energized or deenergized when the voltages delivered by said generators do not balance. A decoding relay is energized at a rate controlled by said first relay. Should said first relay be continuously energized or deenergized due to the unbalanced output of the generators the operation of the decoding relay will be interrupted to indicate a discrepancy in the velocity of the axles.

Other objects and advantages of our invention will become apparent from the following description and the accompanying drawings in which like reference characters refer to like elements throughout and in which:

FIG. 1 is a schematic representation of a circuit in accordance with our invention;

FIG. 2 is a schematic representation of an alternate means for providing an output voltage proportional to angular velocity; and, FIG. 3 is a schematic representation of another means for providing an output voltage proportional to angular velocity.

We shall describe one form of the wheel slip and slide indicating circuit embodying our invention, and shall then point out the novel features thereof in the appended claims.

Referring to FIG. 1, an even number of alternating current generators, G1 through G6, whose outputs are a function of velocity or speed are each coupled to and driven by a respective locomotive axle. The outputs of all the generators are adjusted to be approximately equal for any given speed. The outputs of generators G1 through G6 are rectified by balanced or bridge rectifiers RE1 through RE6 and impressed across an impedance shown as a plurality of series connected resistors R1 through R6, respectively.

The polarity of rectifiers RE1, RE3 and RE5 are oriented such as to provide a current through resistors R1, R3 and R5 in a direction to the right as indicated by the arrows below said resistors. Rectifiers RE2, RE4 and RE6 are connected such as to provide a current through resistors R2, R4 and R6 in a direction to the left as indicated by the arrows below said resistors. It can be readily appreciated that series connected resistors R1 through R6 comprise a common impedance and the current developed in said impedance due to the voltages impressed thereacross balances or cancels when all the axles are rotating at the same speed.

One terminal of the common impedance consisting of series resistors R1 through R6 is connected through a current limiting resistor 11, a battery 12, and the operating coil of a relay 13, to the other terminal of the common impedance. A coding relay 14, operating at a code rate determined by a code transmitter, not shown, is connected such that a back contact $a$, short circuits the battery 12 through the current limiting resistor 11. The voltage of battery 12 is arranged to be of just sufficient potential to energize relay 13, at the coding rate determined by relay 14, when the net voltage across resistors R1 through R6 is substantially zero.

Should one pair of wheels slip or slide by a predetermined amount, an unbalanced direct current voltage will be developed across the common impedance consisting of series resistors R1 through R6. If the unbalanced voltage has a polarity which tends to aid the battery 12 voltage, relay 13 will be maintained energized and will not follow the coding relay. If the unbalanced voltage has a polarity which is in bucking relation to the battery 12 voltage, relay 13 will be deenergized and will also not follow the coding relay. Relay 13 will thus maintain its contact $a$ either picked up or released and thus stop the decoding action when an unbalanced voltage occurs in the generator output.

A slow release decoding relay 15 is operated by the well known condenser decoding method. Condenser 17 is charged over a circuit extending from terminal B, through contact $a$ of relay 13, condenser 17, and resistor 16 to terminal N. A battery having positive and negative terminals B and N, respectively is conventionally shown as being adapted to be connected to the circuit. Condenser 17 discharges over back contact $a$ of relay 13, the operating coil of relay 15, and resistor 16 to condenser 17 thus causing relay 15 to be periodically energized at the coding rate. When relay 15 is energized its front contact $a$ picks up and completes a circuit from terminal B through front contact $a$ and a colored indicating light, preferably green, to terminal N. Since relay 15 is a slow release relay, periodic energization of its operating coil at the coding rate will maintain its contact $a$ picked up. Likewise, when relay 15 is deenergized its front contact $a$ releases and completes a circuit from terminal B through back contact $a$ and a different colored indicating light, preferably red, to terminal N. Thus a warning indication is provided when slipping or sliding occurs.

Should any of the components including the generators, rectifiers, resistors, batteries, or any of the relays fail the coding action will cease and provide an immediate indication of circuit failure. If any one of the generators fail an unbalanced operating voltage will result, stopping coding action. Likewise, if the rectifiers or if resistors R1 through R6 become short circuited or open an unbalanced voltage will occur. Should any of the relays or their circuit components become short circuited or open the coding action will also cease. Thus a positive or fail-safe circuit is provided.

Alternative means for generating or providing a voltage which is proportional to the speed of their respective axles are shown in FIGS. 2 and 3. FIGS. 2 and 3 each show only one unit, however, the various units are similar so that an explanation of one is deemed sufficient to the understanding of our invention. The remainder of the indicating circuit and the operation thereof may be similar to that as described in FIG. 1.

In FIG 2, a cam 19 driven by an associated axle operates a two-position switch 18 which connects to the positive terminal B of a source of potential and causes current to flow alternately and in opposite directions through the two halves of a center tapped primary winding 20 of transformer 21 to terminal N. Thus an alternating current will be induced in secondary winding 22 of transformer 21. The alternating current output from secondary winding 22 is applied to rectifier RE1, and consequently a direct current is impressed across resistor R1. A filtering capacitor 23 for smoothing out the pulsating current may be connected in parallel to resistor R1.

In FIG. 3, rectifier RE1 is replaced by a second cam 24 which is driven synchronously with the first cam 19. In this embodiment the secondary winding 22 of transformer 21 is center-tapped to provide a return path for direct current flow through resistor R1. Assume the cams 19 and 24 are in the position shown, current flow in primary winding 20 may then be in the direction shown by the solid arrow. A current will be induced in secondary winding 22 in the direction shown by the solid arrow through the front contact of switch 25, resistor R1 and back to the center tap of secondary winding 22. When the cams 18 are in a position such that switches 18 and 25 engage their back contacts, a current will be induced in secondary winding 22 in the direction shown by the dotted arrow through the back contact of switch 25, through resistor R1 in the same direction as before, and back to the center tap of secondary winding 22.

To provide voltages in resistors R2, R4, and R6 having opposite polarities to the voltages in R1, R3 and R5 the secondary windings of their respective transformers corresponding to secondary winding 22 may be wound in opposite direction to winding 22.

While our invention has been described with reference to a particular embodiment thereof, it will be understood that various modifications may be made by those skilled in the art without departing from the invention. The appended claims are therefore intended to cover all such modifications within the true spirit and scope of the invention.

Having thus described our invention, what we claim is:

1. A circuit for indicating variations in the angular velocity of wheels on a railway vehicle, said circuit adapted to be connected to a plurality of velocity responsive means associated with respective ones of said wheels each of which velocity responsive means develops an alternating current output voltage proportional to the angular velocity of its associated wheel, said circuit comprising, an impedance member, means receiving and rectifying the output voltage from said velocity responsive means, said rectifying means being connected to provide voltages of opposing polarity in alternate portions of said impedance such that when said wheels are rotating at the same speed the voltages cancel out, a first relay, a resistive element connected across said impedance in series with said first relay, a source of direct current potential, a code following relay operative to alternately connect said source of potential across said impedance, said resistor, and said first relay, and then to connect said source of potential across said resistive element only, said source of potential being capable of energizing said first relay when the output voltages of said velocity responsive means cancel out, and said source of potential being ineffective to control said first relay when the output of said velocity responsive means is unbalanced, and a decoding relay controlled by said first relay, one of a pair of indicating means being energized by said decoding relay dependent on the operation of said first relay.

2. A circuit for indicating any variation in the angular velocity of the wheels on a railway vehicle, said circuit being adapted to be connected to a plurality of velocity responsive means associated with respective ones of said wheels each of which velocity responsive means develops an alternating current output voltage proportional to the angular velocity of its associated wheel, said circuit comprising, a plurality of impedances connected in series, means rectifying the output voltage from each of said velocity responsive means, each of said rectifying means being connected across one of said impedances and each of said rectifying means being so poled as to provide voltages of opposing polarity in alternate ones of said impedances such that when said wheels are rotating at the same speed the voltages cancel out, a first relay, a battery, and a current limiting resistor connected across said impedances; a code following relay operative to alternately connect said battery across said impedance and said resistor and then to connect said battery across said resistor only, said battery having a potential capable of energizing said first relay at a timing rate determined by said code following relay when the output voltages from said velocity responsive means cancel out, and said battery being ineffective to control said relay at said timing rate when the output of said velocity responsive means is unbalanced, and a decoding relay controlled by said first relay, one of a pair of indicating means being energized by said decoding relay dependent on the operations of said first relay.

3. A circuit for indicating variations in the angular velocity of the wheels on a railway vehicle comprising a plurality of cam means coupled to respective ones of said wheels, each of said cam means arranged to control an electrical circuit supplied by a battery to develop a pulsed voltage at a rate dependent on the velocity of their respective wheels, transformer means associated with each cam means receiving said pulsed voltage and developing an alternating current voltage, an impedance member, means receiving and rectifying said alternating current voltage, said rectifying means being connected to provide direct current operating voltages of opposing polarity in alternate portions of said impedance member so that when said wheels are rotating at the same velocity, said operating voltages cancel out, a first relay, a battery, and a current limiting resistor connected across said impedance; a code following relay operative to alternately connect said battery across said impedance and said resistor and then to connect said battery across said resistor only, said battery having a potential capable of energizing said first relay at a rate determined by said code following relay when said operating voltages cancel out, and said battery being effective to control said relay at said rate when the output of said velocity responsive means in unbalanced, and a decoding relay controlled by said first relay, one of a pair of indicating means being energized by said decoding relay dependent on the operations of said first relay.

4. A circuit for indicating variations in the angular velocity of the wheels on a railway vehicle comprising a plurality of pairs of cam means coupled to respective ones of said wheels, one cam of each pair of cam means being arranged to control an electrical circuit supplied by a battery to develop a pulsed voltage at a rate dependent on the velocity of their associated wheels, transformer means associated with each cam means receiving said pulsed voltage and developing an alternating voltage, the alternating voltage from said transformer being connected through a circuit controlled by the second cam of said pair to cause said alternating voltage to be rectified, an impedance member, said rectified voltage from each of said cam means being connected across respective portions of said impedance member, said transformer being wound to provide current flow such that rectified voltages of opposing polarity are developed in alternate portions of said impedance member so that when said wheels are rotating at the same speed said rectified voltages cancel out, a first relay, a battery, and a current limiting resistor connected across said impedance, a code following relay operative to alternately connect said battery across said impedance and said resistor and then to connect said battery across said resistor only, said battery having a potential capable of energizing said first relay at a rate determined by said code following relay when said rectified voltage cancel out, and said battery being effective to control said relay at said rate when the output of said velocity responsive means is unbalanced, and a decoding relay controlled by said first relay, one of a pair of indicating means being energized by said decoding relay dependent on the operations of said first relay.

5. A circuit for indicating the occurrence of variations in the angular velocity of axles of a vehicle comprising means responsive to axle rotation for generating unidirectional voltages proportional to the angular velocity of the axles, an impedance means including terminals connected to the generating means for deriving a resultant of the generated voltages except when said axles are rotating at the same speed, a source of direct current, a device having first and second states in series with said source across the terminals of said impedance means, said device being operated to its first state when the resultant voltage across said impedance means changes in a direction to oppose said source and to its second state when the resultant voltage across said impedance means changes in a direction to aid said source, means for short-circuiting said source periodically to actuate said device alternately from its first to its second state in the absence of a resultant voltage, and code detecting means for detecting the periodic actuation of said device.

References Cited in the file of this patent

UNITED STATES PATENTS

| | | |
|---|---|---|
| 2,652,555 | Smith | Sept. 15, 1953 |
| 2,710,951 | Staples | June 14, 1955 |
| 2,762,464 | Wilcox | Sept. 11, 1956 |
| 2,812,513 | Breggin | Nov. 5, 1957 |